(12) United States Patent
Nauer (10) Patent No.: US 7,722,089 B2
(45) Date of Patent: May 25, 2010

(54) FLUID COUPLING

(75) Inventor: Gary Nauer, Albury (AU)

(73) Assignee: Parker Hannifin Pty Limited, New South Wales (AU)

( * ) Notice: Subject to any disclaimer, the term of this patent is extended or adjusted under 35 U.S.C. 154(b) by 0 days.

(21) Appl. No.: 11/946,903

(22) Filed: Nov. 29, 2007

(65) Prior Publication Data

US 2008/0111377 A1 May 15, 2008

Related U.S. Application Data

(63) Continuation of application No. PCT/AU2006/000902, filed on Jun. 27, 2006.

(30) Foreign Application Priority Data

Jun. 27, 2005 (AU) ............................... 2005903389

(51) Int. Cl.
*F16L 37/00* (2006.01)
(52) U.S. Cl. ..................... 285/321; 285/305; 285/308; 285/45
(58) Field of Classification Search ................ 285/321, 285/305, 403, 308, 45
See application file for complete search history.

(56) References Cited

U.S. PATENT DOCUMENTS

| | | | | |
|---|---|---|---|---|
| 472,342 A | * | 4/1892 | Draudt | 285/321 |
| 2,805,089 A | * | 9/1957 | Hansen | 285/321 |
| 2,898,130 A | * | 8/1959 | Hansen | 285/321 |
| 3,151,891 A | * | 10/1964 | Sanders | 285/321 |
| 3,381,983 A | * | 5/1968 | Hanes | 285/321 |
| 3,521,911 A | * | 7/1970 | Hanes et al. | 285/321 |
| 3,559,681 A | * | 2/1971 | Jarvis et al. | 285/321 |
| 4,007,953 A | * | 2/1977 | Powell | 285/321 |
| 4,565,392 A | * | 1/1986 | Vyse | 285/321 |

(Continued)

FOREIGN PATENT DOCUMENTS

CA 2201221 10/2007

(Continued)

OTHER PUBLICATIONS

Australian Patent Office International-Type Search Report in corresponding Australian Patent Application No. 2005903389 dated Jul. 4, 2005.

(Continued)

*Primary Examiner*—David E Bochna
(74) *Attorney, Agent, or Firm*—John A. Molnar, Jr.

(57) ABSTRACT

Fluid coupling for connecting pressurised conduits. The coupling includes a spigot having a first circumferential groove disposed on an outer surface thereof and a socket having a second circumferential groove on an inner surface thereof. The spigot and the socket are adapted for axial engagement whereby the conduits are sealingly connected for fluid communication through the coupling and whereby the circumferential grooves are substantially in radial alignment. A releasable retaining member is moveable between a locked configuration, wherein the retaining member extends radially into both grooves to prevent axial disengagement of the spigot and the socket, and a release configuration wherein the retaining member is disposed substantially within one of the grooves and is substantially clear of the other to permit axial disengagement. The coupling further may include a release mechanism for moving the retaining member from the locked configuration to the release configuration.

9 Claims, 5 Drawing Sheets

U.S. PATENT DOCUMENTS

| | | | |
|---|---|---|---|
| 5,172,941 A | | 12/1992 | Pawelzik et al. |
| 5,498,042 A | | 3/1996 | Dole et al. |
| 5,681,060 A | * | 10/1997 | Berg et al. ............... 285/305 |
| 5,794,988 A | * | 8/1998 | Gill .......................... 285/305 |
| 5,876,071 A | * | 3/1999 | Aldridge .................. 285/321 |
| 5,882,044 A | * | 3/1999 | Sloane ..................... 285/321 |
| 6,102,447 A | * | 8/2000 | Aldridge .................. 285/305 |
| 6,186,560 B1 | * | 2/2001 | Gill .......................... 285/305 |
| 6,386,596 B1 | * | 5/2002 | Olson ...................... 285/321 |
| 6,932,391 B2 | * | 8/2005 | Lebreton et al. .......... 285/321 |

FOREIGN PATENT DOCUMENTS

| | | |
|---|---|---|
| DE | 27 01 873 | 7/1977 |
| DE | 102 00 574 C1 | 9/2000 |
| DE | 200 11 757 U1 | 9/2000 |
| EP | 0044778 B1 | 2/1985 |
| EP | 0444857 B1 | 11/1993 |
| EP | 0 665 402 B1 | 6/1998 |
| EP | 1336790 A1 | 8/2003 |
| JP | 07-190262 A | 7/1995 |
| JP | 11-094151 A | 4/1999 |
| WO | 9506221 | 3/1995 |
| WO | 97 13094 | 4/1997 |
| WO | 9748937 | 12/1997 |

OTHER PUBLICATIONS

International Search Report in corresponding International PCT Application No. PCT/AU2006/000902.

* cited by examiner

FLUID COUPLING

CROSS REFERENCE TO RELATED APPLICATIONS

This application is a continuation of co-pending International Application No. PCT/AU2006/000902, filed Jun. 27, 2006, which designated the United States, and which application claims priority to Australian Patent Application No. 2005903389, filed Jun. 27, 2005, the disclosure of which applications are incorporated herein by reference.

BACKGROUND OF THE INVENTION

The present invention relates to fluid couplings and particularly to a high-pressure hydraulic fluid coupling for use in the mining industry. However, it will be appreciated that the invention to be described hereinafter with reference to this application is not necessarily limited to this particular field of use.

Fluid couplings are typically comprised of male and female members connected in fluid-tight relationship by some form of retention mechanism to provide sealed fluid communication between adjoining sections of hose or pipe. Such retention mechanisms include threaded fasteners, nuts and sleeves, bolted retaining flanges, ball detents, ring clamps, and the like. The type of coupling, the operating pressure, the expected frequency of decoupling and the access conditions, often determine the required form of retention mechanism in any particular application.

Some couplings employ a generally U-shaped locking staple adapted for insertion transversely with respect to the coupling axis through complementary slots, apertures or grooves formed in the respective coupling members, to prevent decoupling. Such couplings are often used in the mining industry. They provide a relatively quick release mechanism, simply requiring withdrawal of the locking staple, while typically permitting relative rotation between the male and female members. Such couplings are disclosed more specifically, for example, in Greenawalt et al., U.S. Pat. No. 4,260,184, and Hinksman et al., U.S. Pat. No. 4,923,350.

Presently in the mining industry, staple type couplings are being increasingly subjected to and used with higher system pressures to achieve increased production rates in more demanding circumstances with equipment of the same or reduced size. Accordingly, there exists a need for a more efficient and robust coupling design, which will accommodate further increases in hydraulic pressure without compromising the physical size or reliability of the coupling itself.

SUMMARY OF THE INVENTION

The present invention relates to a fluid coupling for connecting pressurised conduits. In an illustrated embodiment, the coupling includes:
a spigot adapted for connection to a first conduit, the spigot having a first circumferential groove disposed on an outer surface thereof;
a socket adapted for connection to a second conduit, the socket having a second circumferential groove disposed on an inner surface thereof,
the spigot and the socket being adapted for axial engagement whereby the first and second conduits are sealingly connected for fluid communication through the coupling and whereby the first and second circumferential grooves are substantially in radial alignment, the outer surface of the spigot and the inner surface of the socket incorporating corresponding tapered portions;
a releasable retaining member being selectively moveable between a locked configuration wherein the retaining member extends radially into both of the grooves to prevent axial disengagement of the spigot and the socket, and a release configuration wherein the retaining member is disposed substantially within one of the grooves and clear of the other of the grooves thereby to permit the axial disengagement; and
a release mechanism enabling movement of the retaining member from the locked configuration to the release configuration which release mechanism may include an opening disposed in a peripheral sidewall of the socket to provide radial access to the releasable retaining member.

In the release configuration, the retaining member may be disposed substantially within the first circumferential groove and substantially clear of the second groove thereby to permit axial disengagement of the coupling. Alternatively, the retaining member in the release configuration may be disposed substantially within the second circumferential groove and substantially clear of the first groove. The spigot, socket and grooves may be substantially annular in transverse cross-sectional profile.

The retaining member may include a generally arcuate body portion and two circumferentially spaced end portions extending generally outwardly from the body to define respective release lugs. In an illustrated embodiment, the retaining member is substantially Ω-(omega)-shaped. The body portion of the retaining member may have a substantially square, rectangular, oval or round cross-sectional profile.

The outer surface of the spigot and the inner surface of the socket may have substantially complementary profiles.

The coupling also may include a biasing member to bias the retaining member towards the locked configuration. The retaining member may be formed from a resilient material such as spring steel.

The opening in the socket may be adapted to provide access to the release lugs of the retaining member. The coupling may also include a removable cover to selectively close and seal the opening. The cover may be formed from an elastomeric material.

An expansion tool can be adapted for insertion through the opening to circumferentially spread the release lugs and resiliently expand the retaining member fully into the second groove, and into the release configuration. This provides a temporarily unobstructed path permitting the spigot to be inserted into or withdrawn from the socket.

The socket may include a circumferential sealing groove disposed on the inner surface, the sealing groove being adapted to house a circumferential sealing member adapted for sealing engagement with the adjacent outer surface of the spigot thereby to provide a fluid seal between the spigot and socket in the locked configuration. In an alternative embodiment, the sealing groove may be formed on the outer surface of the spigot. The sealing member may be formed from an elastomeric material and may be provided in the form of an O-ring. Multiple seals may also be provided, if required.

The coupling can be configured to permit relative rotation between the spigot and socket in the locked configuration. Alternatively, however, the coupling may be configured to prevent relative rotation between the spigot and socket in the locked configuration.

The retaining member can be configured so as not to extend past the outer periphery of the socket in the locked configuration. The retaining member may be laminated.

The coupling is may be adapted to operate in a pressure range of 2,000-20,000 psi, and typically between 5,000-20,000 psi, and more typically between 10,000-20,000 psi. The coupling may be adapted to operate in these respective pressure ranges with a safety factor of at least 3:1, and ideally 4:1.

The coupling may be adapted to join conduits with an internal diameter of between 5-100 mm, and typically between 10-80 mm.

The internal diameters of the spigot and socket at their narrowest points are preferably no less than the nominal diameter of the respective conduits to which they are connected. The bore of the coupling is preferably consistent between the spigot and socket to minimise turbulence and pressure drop across the coupling.

These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Figure 1:
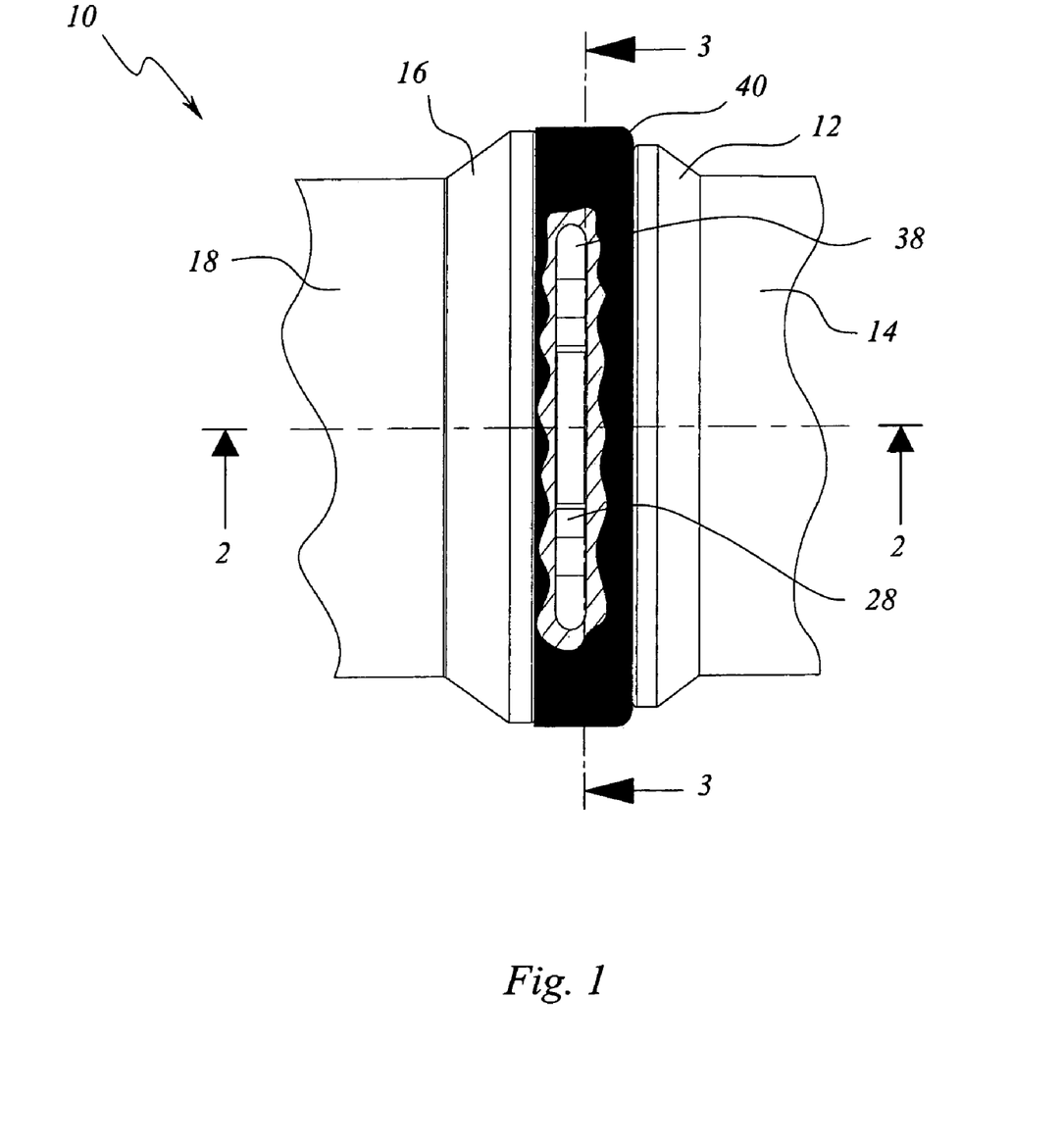
FIG. 1 is a partly cut-away plan view of a fluid coupling according to the invention.
Figure 2:
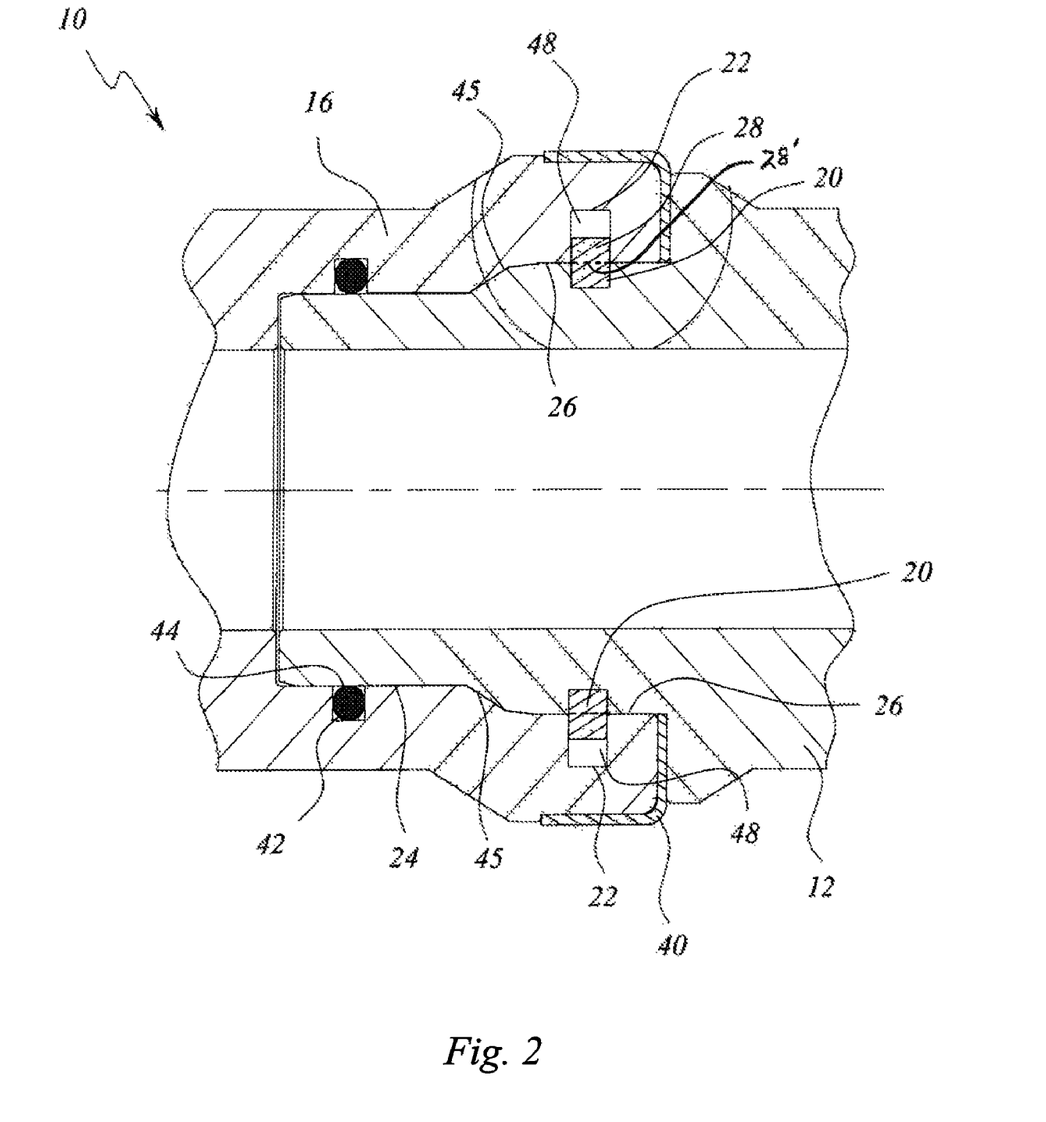
FIG. 2 is a cross-sectional view taken on line 2-2 of FIG. 1.

Referring to FIG. 1 of the drawings, the invention provides a fluid coupling 10 including a spigot 12 adapted for connection to a first conduit 14 and a complementary socket 16 adapted for connection to a second conduit 18. With additional reference to FIG. 2, the spigot incorporates a first circumferential groove 20 disposed on an outer surface 24 and the socket incorporates a second circumferential groove 22 disposed on inner surface 26. As shown in FIG. 2, the spigot and socket are adapted for axial engagement in a coupled configuration whereby the first and second conduits are sealingly connected for fluid communication and the first and second grooves are disposed in substantial radial alignment, in the sense of providing at least some degree of relative overlap therebetween.

A releasable retaining member 28 is selectively movable between a locked configuration wherein the retaining member extends radially into both grooves to prevent axial disengagement of the spigot and socket, and a release configuration wherein the retaining member is disposed substantially within one of the grooves 20 or 22 and clear of the other groove, to permit axial disengagement of the coupling. In the illustrated embodiment, the release configuration is defined as is shown in FIG. 2 by the retaining member, the inner diametric extent thereof now being shown in phantom at 28', being disposed substantially within the second or inner circumferential groove 22 in the socket and clear of the first or outer groove 20 on the spigot. Conversely, in an alternative embodiment (not shown), the release configuration is defined by the retaining member being disposed substantially within the first (outer) groove 20 and clear of the second (inner) groove 22.

In the illustrated embodiment shown, the fluid coupling also includes a release mechanism to permit movement of the retaining member from the locked configuration to the release configuration.

Figure 3:
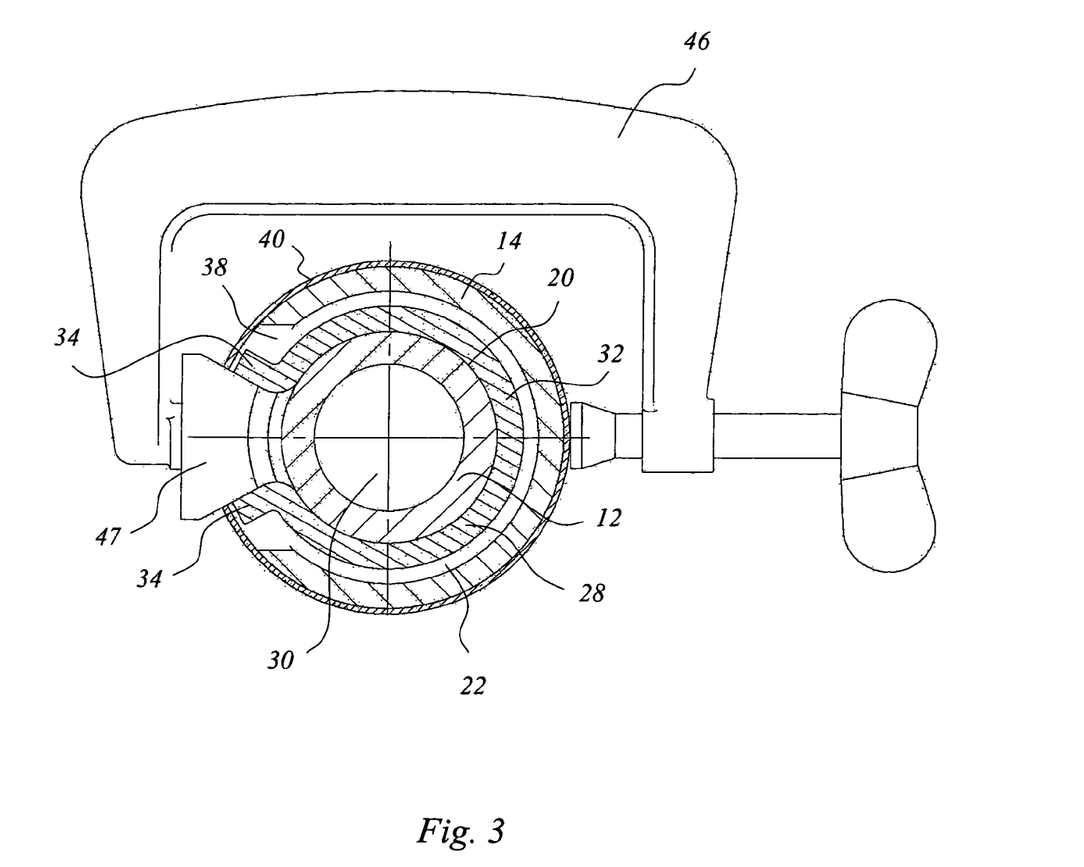
FIG. 3 is a cross-sectional view taken on line 3-3 of FIG. 1.

As best shown in FIG. 3, the spigot 12, socket 16, and grooves 20 and 22 have substantially annular transverse cross-sectional profiles such that in the coupled configuration, a high-pressure fluid is permitted to flow freely between the adjoining conduits through a central region 30 of the coupling, which is substantially circular in cross-section.

Referring now to FIGS. 4a-4e, the retaining member 28 is generally Ω-(omega)-shaped, including a generally arcuate body portion 32 and two circumferentially spaced end portions extending radially outwardly to define respective release lugs 34. The arcuate body of the retaining member may extends angularly for more than 180°, and preferably for more than 270°, and ideally for more than 300°. In this regard, it will be appreciated that the first and second circumferential grooves on the respective coupling members may be substantially co-extensive with the body of the retaining member or may extend for 360° (as shown), subject to relevant design constraints.

The retaining member may be formed from a resilient material such as spring or stainless steel, thereby providing an inherent bias disposing the retaining member towards the locked configuration. It will be appreciated, however, that other forms of bias such as mechanical or pneumatic spring mechanisms, or electromagnetic biasing systems may alternatively be used.

Figure 4A:
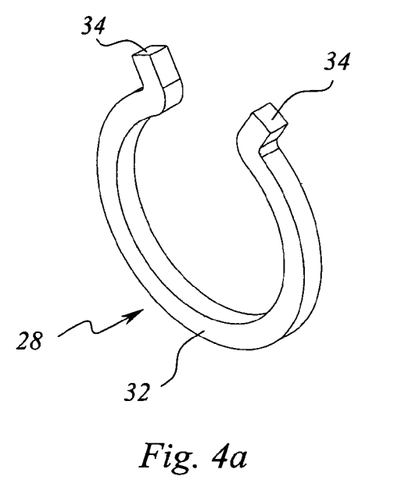
FIGS. 4a-4e show five different embodiments of a retaining member to be used with the fluid coupling of FIG. 1.
Figure 4B:
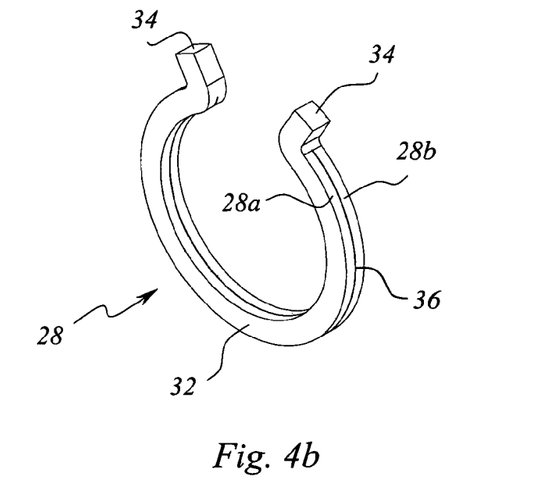
Figure 4C:
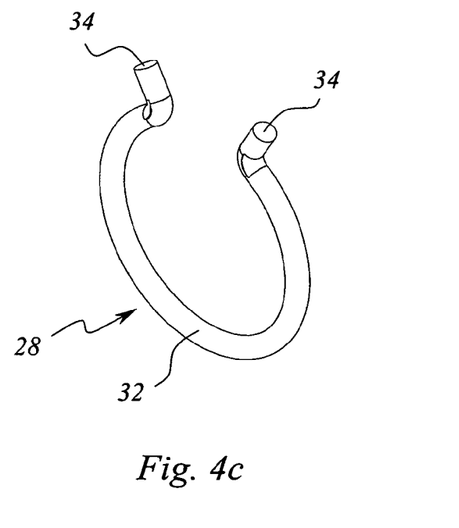
Figure 4D:
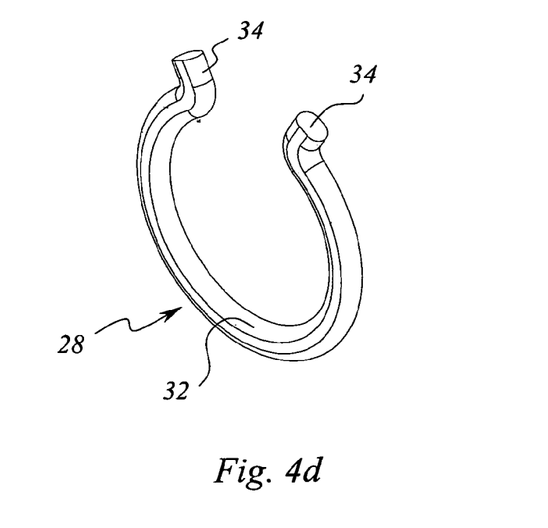

The retaining member 28 may have a square, rectangular, circular or oval cross-sectional profile as depicted by FIGS. 4a-4d respectively. Other suitable cross-sectional profiles may also be used. In addition, FIG. 4b shows a retaining member that is laminated, comprising two fixedly connected half-sections 28a and 28a. As a variation on this embodiment, the retaining member may be formed primarily as a unitary component, but may include a slit or slits 36 to confer the characteristics of a partially or semi-laminated construction. In this regard, lamination or partial lamination of the retaining member may provide a higher resistance to dynamic loading than that of a solid or unitary construction.

Figure 4E:
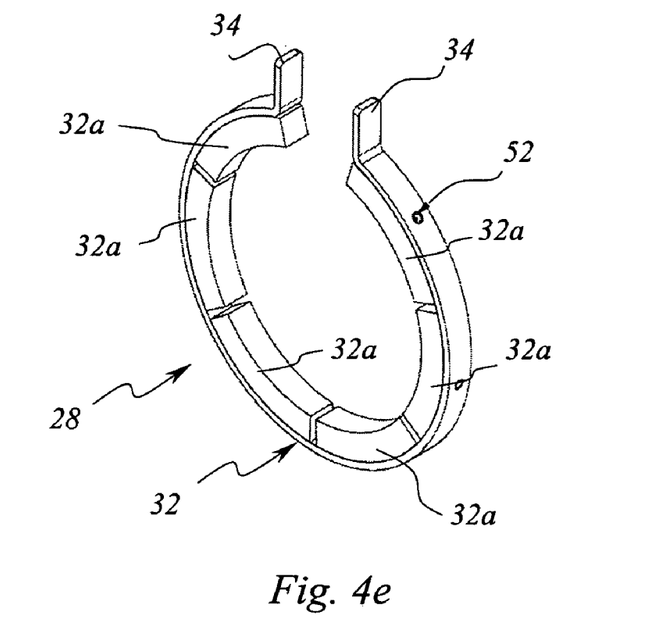

FIG. 4e shows a further embodiment of the retaining member 28, having a plurality of segments 32a secured to the arcuate body portion 32 by pins 52 or other suitable attachment means such as screws, bolts, rivets, adhesives, welds, crimps, brackets, clips, interference fittings, or the like. This multi-segment design provides additional flexibility in terms of the annular bearing surface area, the threshold force required to separate the release lugs, and the use of composite materials in construction.

The release mechanism may include an opening in the form of an elongate access slot 38 disposed in the socket. The slot allows access to the release lugs 34 of the retaining member thereby to permit movement of the retaining member from the locked to release configuration. A removable elastomeric boot 40, which may be mechanically retained between the spigot and the socket, may be used to cover and seal the access slot, thereby restricting the ingress of extraneous debris in use. The boot is sufficiently flexible to allow for its displacement during assembly and disassembly of the coupling, yet has sufficient shape memory to return to act as a seal for the access slot.

The socket further may include a circumferential sealing groove 42 disposed on the inner surface 26. The sealing groove houses an elastomeric circumferential fluid seal, in the form of an O-ring 44, for sealing engagement with the outer surface 24 of the spigot to provide a fluid seal between the spigot and socket in the locked configuration. Further sealing may be provided by the outer surface of the spigot and the corresponding inner surface of the socket having complementary profiles adapted for close-fitting engagement in the coupled configuration. These profiles also include corresponding tapered sections 45 to facilitate initial alignment and engagement.

As will be appreciated by those skilled in the art, this facilitation occurs because upon assembly, at the initial point of insertion, the outer diameter of the spigot is substantially smaller than the inner diameter of the socket. The resultant radial clearance accommodates a significant degree of both radial and axial misalignment. Upon further axial insertion, the complementary tapered or ramped surfaces provide a progressive "lead in" to the point of precise alignment in the fully engaged position.

To connect the spigot to the socket, the retaining member 28 is first placed within the socket such that it rests within the second or inner circumferential groove. As best shown in FIG. 3, a suitable release tool such as clamp 46 incorporating an extraction wedge 47, is then inserted through the access slot 38 and engaged to circumferentially spread the release lugs, thereby resiliently expanding the retaining member fully into the second groove 22, into the release configuration. The radial expansion of the retaining member is accommodated by a void region 48 in the second groove. This expansion in turn provides a temporarily unobstructed path permitting the spigot to be inserted axially into the socket.

Figure 5:
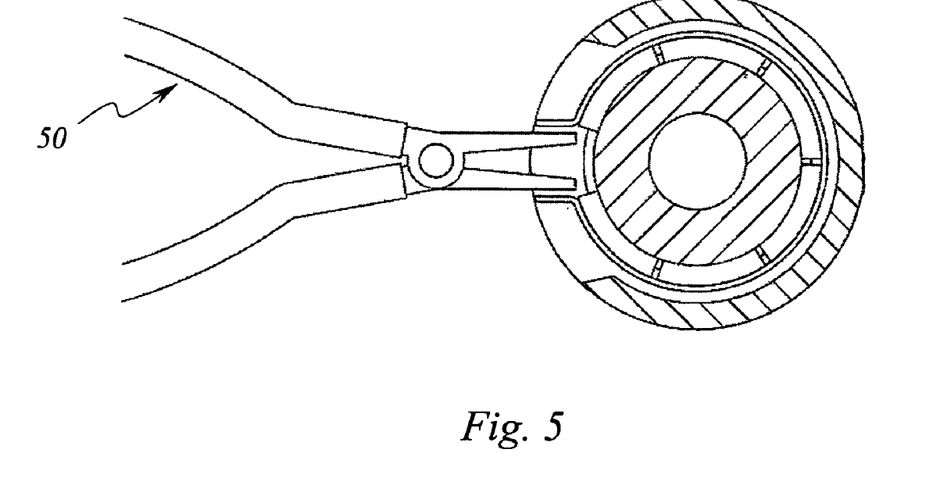
FIG. 5 is a cross-sectional view taken along line 3-3 of FIG. 1, showing a alternative form of release tool.

FIG. 5 shows an alternative release tool in the form of a caliper 50, which may be used to spread the release lugs 34 when using the segmented retaining member of FIG. 4e, which may be designed to require a relatively lower separation force.

Once the spigot is fully inserted into the socket in the coupled configuration, the release tool is removed, whereupon the retaining member resiliently contracts so as to extend into the first circumferential groove 20 on the spigot. Since the retaining member now extends radially into both grooves, the locked configuration is established in which the spigot is prevented from being axially withdrawn from the socket. In this configuration, the O-ring provides a static seal between the spigot and socket so as to maintain a leak free joint.

In some embodiments, the tapered portion 45 of the spigot 12 acts to automatically expand the retaining member 28 radially upon axial insertion of the spigot into the socket 16, thereby obviating the need for a release or expansion tool during assembly. This arrangement is particularly suited to the segmented retaining member of FIG. 4e, due to the relatively lower radial separation or expansion force required by such members.

It will be noted that the illustrated coupling 10 allows relative rotation between the spigot and socket in the locked configuration. However, in other embodiments (not shown), the coupling may be configured to prevent relative rotation between the spigot and socket in the locked configuration, if desired. This will depend in part upon the angular extent of the respective inner and outer grooves, as previously discussed.

To disassemble the coupling, the release tool is re-engaged with the release lugs and the retaining member is expanded again into the release configuration, wherein the body of the retaining member is contained substantially within the second circumferential groove, clear the first groove. This allows the spigot to be freely withdrawn.

It will be appreciated that in the illustrated embodiment the body of the retaining member extends simultaneously into both grooves for substantially all of its length in the locked configuration, and hence shear forces resulting from axial loads on the coupling are distributed over substantially the entire effective length of the retaining member. Consequently, a fluid coupling of given size is able to support significantly higher axial separation loads relative to previously known designs, particularly those using staples. Moreover, as best seen in FIG. 2, grooves 20 and 22 may be advantageously located in the diametrically larger areas of the spigot and socket respectively. In this way, a relatively larger retaining member can be used, such that the shear forces are distributed over a relatively larger area of the retaining member. It will also be noted from FIG. 2 that the grooves are formed in areas of relatively increased wall thickness in the respective spigot and socket formations, so as to maximise joint strength, which is particularly advantageous for high pressure applications.

More specifically, the retaining member of the present invention presents a circumferential area in shear corresponding to at least 66% of the circumference of the spigot, representing an effective increase of more than 100% over comparable U-shaped staples. This allows operating pressures in the range of 10,000 to 20,000 psi, with a safety factor of 4:1, in a comparably compact assembly. At the same time, the coupling and decoupling processes are substantially faster and more reliable than those of threaded fittings, which can be damaged by debris, are susceptible to operator error through thread-stripping or incorrect torque setting, and are time-consuming to decouple and reconnect.

Advantageously also, the retaining member of the present invention may be fully contained, and does not extend past the outer periphery of the socket in the locked configuration. It is therefore less vulnerable to inadvertent release or damage, and is less likely to cause injury to people or damage adjacent componentry. It is also not susceptible to inadvertent "walk-out" in response to cyclic loading.

These characteristics make the present invention particularly applicable to high-pressure applications, such as those in the mining industry, where cost, maximum pressure rating, size and weight of equipment, ease of use, consistency and reliability of performance and conservative safety factors are all significant considerations.

Although the invention has been described with reference to specific examples, it will be appreciated by those skilled in the art that the invention may be embodied in many other forms. In particular, it should be appreciated that the retaining member, the associated bias member, the release tool and the corresponding release lugs, as well as the socket and spigot themselves may take a variety of shapes and configurations, other than those specifically illustrated.

What is claimed is:

1. A fluid coupling comprising:
   a spigot end having an outer surface with a first circumferential groove formed therein;
   a socket end having a forward end face and an inner surface with a second circumferential groove formed therein, the spigot end being receivable coaxially within the socket end wherein the first and second circumferential grooves are substantially in radial alignment, and the socket end having a peripheral sidewall adjoining the forward end face with an opening configured as a slot formed therein the sidewall rearward of the forward end face;

a retaining member configured as a spring ring having a normal first diameter and being resiliently expandable or contractible to a second diameter, the spring ring being accessible through the opening for expanding or contracting the ring into its second diameter; and a removable cover for sealing the opening, the cover having a first portion disposed on the socket end forward end face and a second portion extending from the first portion over the sidewall and circumferentially surrounding the sidewall and covering the slot, the cover being formed of an elastomeric material, wherein with the spigot end being received coaxially within the socket end with the first and second circumferential grooves being in substantial radial alignment, the retaining member is moveable between a locked position in which the retaining member in its first diameter extends radially into both of the grooves to delimit the removal of the spigot end from the socket end, and a release position in which the retaining member in its second diameter is disposed substantially within one of the grooves and is substantially clear of the other one of the grooves to allow the removal of the spigot end from the socket end, and wherein the cover is flexibly displaceable during the assembly and disassembly of the coupling.

2. The fluid coupling of claim 1 wherein a portion of the spigot outer surface and a portion of the socket inner surface are complementarily tapered.

3. The fluid coupling of claim 1 wherein in the release position, said retaining member is disposed substantially within said second circumferential groove and is substantially clear of the first groove to thereby allow the removal of the spigot end from the socket end.

4. The fluid coupling of claim 1 wherein said retaining member includes a generally arcuate body portion and a pair of circumferentially spaced-apart end portions extending generally outwardly from said body portion to define a pair of respective release lugs, the lugs extending radially into the opening to be engageable through the opening for expanding or contracting the ring into its second diameter.

5. The fluid coupling of claim 4 wherein said retaining member is generally Ω-(omega)-shaped.

6. The fluid coupling of claim 4 further comprising a release tool, the tool being insertable through the opening to engage the release lugs to expand or contract the ring into its second diameter.

7. The fluid coupling of claim 4 wherein the release lugs do not extend radially through the opening beyond the outer surface of the socket end.

8. The fluid coupling of claim 1 wherein the socket end inner surface has a circumferential sealing groove formed therein, the coupling further comprising a seal member received within the sealing groove for proving a fluid-tight seal between the spigot end and the socket end in the locked position.

9. The fluid coupling of claim 1 wherein the spigot end and the socket end are relatively rotatable in the locked position.

* * * * *